Sept. 27, 1932.  P. J. FITZGERALD  1,879,675
MOTOR ASSEMBLY INCLUDING SPEED CONTROL
Filed May 9, 1930  2 Sheets-Sheet 1
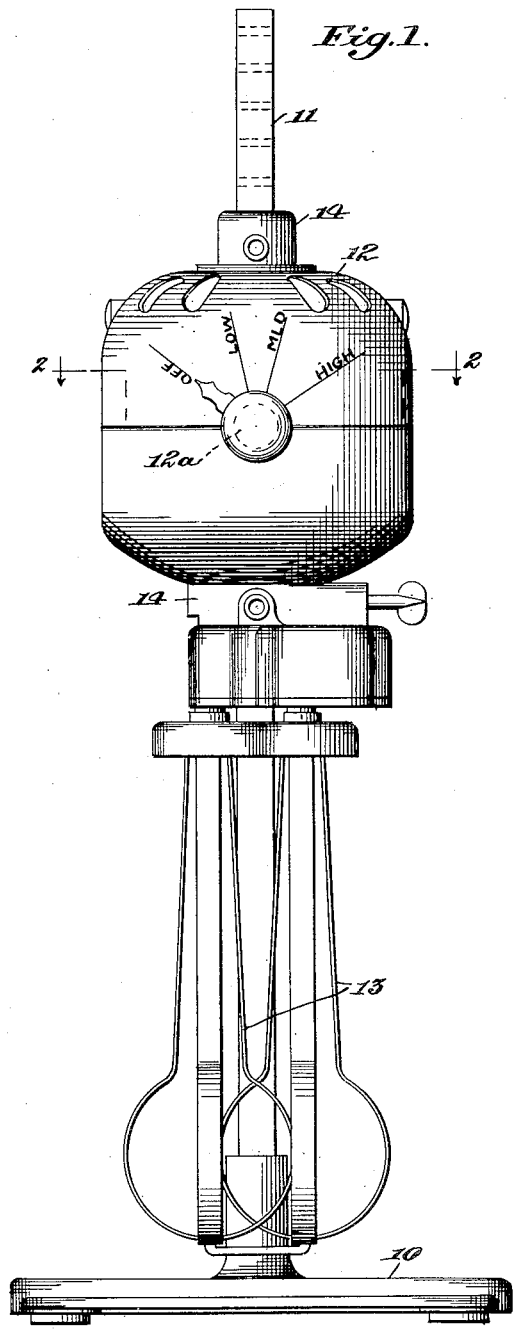
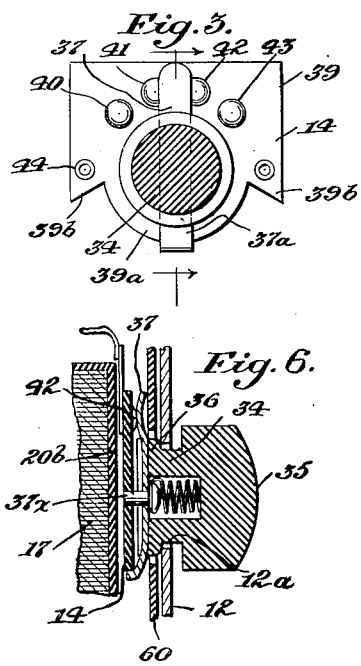
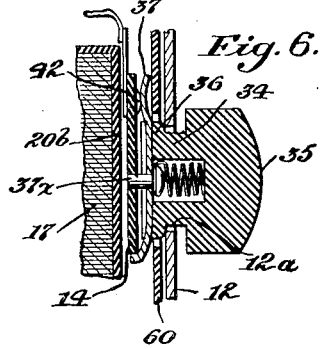
Inventor:
Patrick J. Fitzgerald,
by
Attys.

Sept. 27, 1932.   P. J. FITZGERALD   1,879,675
MOTOR ASSEMBLY INCLUDING SPEED CONTROL
Filed May 9, 1930   2 Sheets-Sheet 2
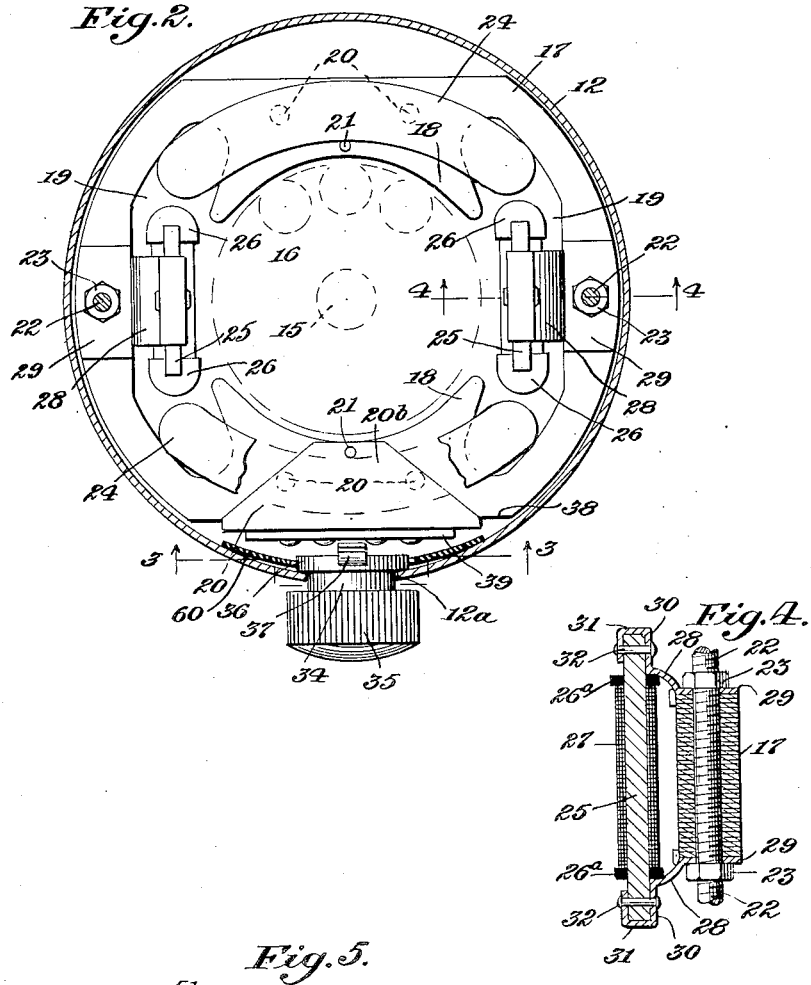
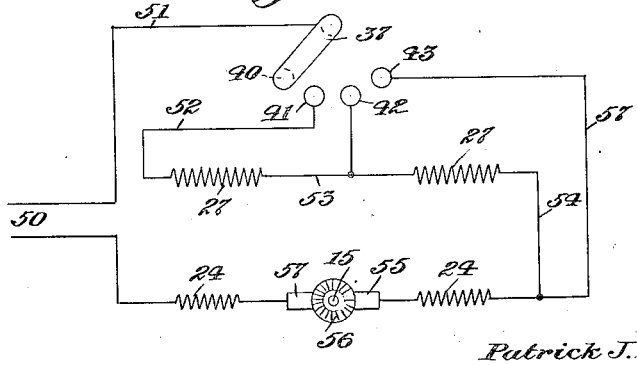
Inventor:
Patrick J. Fitzgerald,
by
Attys.

Patented Sept. 27, 1932

1,879,675

UNITED STATES PATENT OFFICE

PATRICK J. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

MOTOR ASSEMBLY INCLUDING SPEED CONTROL

Application filed May 9, 1930. Serial No. 451,129.

This invention relates to improvements in motor assemblies, and more particularly concerns a compact device substantially free from external encumbrance and of symmetrical shape.

One of the features of the present invention is the provision of a speed control for a small utility motor, in which all parts of the control system proper are located within the shell or casing of the motor.

Another feature of the invention is the provision of a field core structure adapted to receive the resistance units of the speed control.

A further feature of the invention is the provision of a compact motor assemblage in which a speed control operator is located on the enclosing shell or casing, while the electrical connections are all contained within the said shell or casing.

A still further object of the invention is the provision of a resistance coil mounting by which the coil is located in a position where it is not subject to mechanical damage and does not affect the appearance of the motor assembly, and yet is held firmly and rigidly in its required place.

With these and other objects in view as will appear in the course of the following specification and claims, an illustrative example of construction of a device according to this invention is shown on the accompanying drawings, in which: —

Figure 1 is a front elevation of a motor assembly as applied to a beater.

Fig. 2 is a horizontal sectional view, on a larger scale, substantially on line 2—2 of Fig. 1.

Fig. 3 is a detail view of the switch elements, substantially on line 3—3 of Fig. 2.

Fig. 4 is a sectional detail view substantially on line 4—4 of Fig. 2.

Fig. 5 is a circuit diagram,

Fig. 6 is a fragmentary section through the switch elements.

The present invention concerns a motor assembly having a speed control device, and is illustrated in connection with a beater structure as described in my copending application Serial No. 451,130, filed May 9, 1930, to which reference may be made for features of the mechanical arrangement and construction of other parts of the whole assembly.

In Figure 1, the base 10 has an upright column 11 upon which the motor shell or casing 12 may be adjustably mounted in any desired manner, as for example that described in my aforesaid copending application. The motor armature within the shell drives the beaters 11.

The shell 12 is divided into two halves, each of which is cup-shaped and of substantially the same external diameter, and each of which is provided with an end bearing member indicated at 14 for the shaft 15 of the armature 16 (Fig. 2). In this way, the cups or half-shells may fit together in abutting relationship in a plane substantially at a right angle to the axis of the shaft 15 (Fig. 1).

It is preferred that the shells should be substantially figures of revolution, so that for a portion they are cylinders of circular horizontal section (Fig. 2).

Within the shell 12 is fixedly secured the field core 17 which is preferably composed of a plurality of laminations (Fig. 4) which may be of identical shape. Each of these laminations is provided with the inwardly projecting portions 18 providing pole pieces, between which are the spaces 19. The laminations may be held together by rivets 20 passing therethrough. The field core is held in position within the shell by the bolts 20 with the assistance of the nuts 23. The field windings 24 are located around the field pieces 18 in the usual way, while pins 21 are provided to hold them out of contact with the armature.

The speed control device comprises a switch and resistances and the conductors for connecting the same in the motor circuit. Located in each of the spaces 19 is an insulating member 25 extending substantially parallel to the axis of the shaft 15, and provided with U-shaped members 26 having end flanges 26a, likewise of insulating material. Between the end flanges, the resistance winding 27 is located around the insulating base member 25, clips 28 are provided with feet 29 which rest flat against the outer faces of the field core and around the bolts 22, one of them for each member, clamped in position by one of the nuts 23 (Fig. 4). The clips 28 also have portions 30 located flat against the insulating base member 25, and the inwardly bent ends 31 fitting around the ends of the base member 25. The base member 25 is rigidly connected to the clips 28 by rivets 32. In this way a rigid assemblage of the resistance winding with respect to the field core is obtained.

The two halves of the shell or casing 12 are cut away by semicircles to form a circular opening 12a in which is received the reduced stem 34 of a rheostat knob 35 located on the exterior of the shell. On the inner end of the stem 34 is a collar 36. The collar 36 maintains the stem 34 in proper rotatively-guided position in the aperture 12a. The switch blade 37 is mounted by its pivots 37x and is received in a notch of the collar 36. An insulating cover sheet 60 is located around the collar 36 and between the switch blade 37 and the shell 12.

Opposite the knob 35, the field core 17 is cut away to form a flattened portion 38 upon which the central part of a U-shaped stirrup 20b rests, the legs of this stirrup being held in position by the pins 20 as well as by the conductors leading to the contacts as will be described hereinafter. This cut away portion provides a cavity between the field core 17 and the casing 12 in which the switch parts are located. The stirrup 20b is preferably of insulating material and has mounted thereon an insulating plate member 39 which is provided with four contacts 40, 41, 42, 43, the stirrup and plate member 39 being secured together by the rivets 44. This plate 39 has a portion 39a with a margin arranged concentrically with the axis of the stem 34 (Fig. 3), and portions 39b having edges extending radially beyond the portion 39a to provide limit stops for the extension 37a of the switch blade 37 located diametrally opposite to the contacts 40, 41, 42 and 43 and serving also for guiding the switch blade. It will be noted from Fig. 6 that the switch or rheostat blade 37, 37a is formed to rest against the insulating plate 39 and/or the contacts 40, 41, 42, 43 at both ends, so that there is little or no tendency for the axis of the stem 34 to be rocked through an angle.

In the circuit diagram of Fig. 5, it will be seen that when electrical current flows along the conductors 50, the rheostat knob 35 will govern the position of the switch blade 37 with respect to the contact points so that the speed of rotation of the shaft 15 may be varied. Thus, the current flows by conductor 51 to the switch blade 37. If the switch blade is on the dead contact 40, the circuit is opened and the motor does not move. When the switch blade 37 is moved to contact point 41, the current flows from conductor 51 by contact blade 57, conductor 52, the first resistance 27, conductor 53, the second resistance 27, conductor 54, one field winding 24, brush 55, the armature 56, brush 57, the other field winding 24, back by conductor 50 to the source. The presence of both resistances 27 in the motor circuit causes the rotation of the motor at low speed. If the switch blade 37 be moved to the contact point 42, the current flows as before, but by conductor 51 and switch blade 37, contact point 42, and only through the second resistance 27, and thence through the field windings and armature back to the source: and the motor moves at a greater speed than before, owing to the absence of a portion of the former resistance from the circuit. When the switch blade 37 is moved to contact point 43, the current flows by conductor 51, switch blade 37, contact point 43, and conductor 57 directly to the field windings and the armature and thus back to the source. Both external field regulating resistances have been eliminated from the circuit, and the motor turns at its maximum speed.

It is obvious that the invention is not limited to the form of execution shown, but that it may be modified in many ways within the scope of the appended claims.

Having thus described my invention, what I claim as new and desire to secure by Letters Patent is:

1. In an electric motor assembly, an enclosing shell of substantially circular section, a field core located in said shell and having a flattened portion on its exterior, a rheostat operating element of insulating material journaled in said shell opposite said flattened portion, a switch blade operably connected to said element, an insulating member on the flattened portion of said core, and contact points on said insulating member adapted to be engaged by said switch blade.

2. In an electric motor assembly, a laminated field core, a U-shaped stirrup embracing said core, and holding means to secure said stirrup on said core, an insulating plate mounted on said stirrup, switch points on said insulating plate, and switch means cooperating with said switch points.

3. An electric motor assembly as in claim 2, in which said stirrup is of insulating material, and conductors to said switch points are located between said stirrup and said plate.

4. In an electric motor assembly, an enclosing shell comprising two cup-like portions adapted to fit against one another at their brims, said shell being provided at the junction of the brims with an aperture, a rheostat knob having a reduced stem with a collar at the inner end of said stem, said stem being received within said aperture so that it is retained in position by said collar for rotation in said aperture by said knob and stem, and resistance means located within said shell and controlled by said stem, whereby said knob and stem may be placed in position on one of said portions while the portions are separated and is held in such position when the portions are brought together.

5. In an electric motor assembly, an annular field core having an armature space and having a space therein offset from the armature space, an insulating base member located in said offset space, a resistance mounted on said base member, a clip secured to said base member and having an outwardly bent portion to fit against the core, and means to hold said outwardly bent portion to said core.

6. In an electric motor assembly, a field core having a space therein offset from the armature space, an insulating base member located in said space, a resistance winding on said member, clips secured to said base member and having feet portions resting on the core, a shell, bolts to secure said core in said shell, said clips having apertures through which the bolts pass whereby the clips are held against movement with respect to said core.

7. In an electric motor assembly, a casing, a field core having inwardly extending field pieces and located in said casing, field windings in said core on said field pieces, said field pieces and field windings being spaced apart peripherally, a core bolt engaging said casing to hold the core in position, a resistance element located inside the core in the peripheral space between the field pieces and field windings, and means fixed to the core for holding said resistance element in position.

8. In an electric motor assembly, a casing, a laminated field core having inwardly extending field pieces and located in said casing, a resistance element located inside of the core in the gaps between the field pieces and radially spaced from the armature, clips for removably supporting said resistance element in position in said core, and core bolts engaging said casing to hold the core and element in position in said casing whereby said resistance element and core may be withdrawn from the casing as a unit.

9. In an electric motor assembly, a casing, a laminated field core having inwardly extending field pieces and located in said casing, a resistance element located inside the core in the peripheral space between two of said field pieces, an armature revoluble inside said field pieces and resistance element, a core bolt passing through the core and casing for holding the core in position, a clip surrounding said core bolt and attached to said resistance element to hold the element in position, and a nut on said core bolt for holding the clip fixed to the core.

10. In an electric motor assembly, a casing, an annular field core having a pair of inwardly extending field pieces located in said casing, said field pieces being located diametrically opposite one another and spaced apart peripherally, a pair of resistance elements located inside the core diametrically opposite one another in the peripheral spaces between the field pieces, and means fixed to the core for holding said resistance elements in position, whereby said resistance elements may be removed from the assembly of the core and field pieces.

11. In an electric motor assembly, a casing of circular section, an armature concentrically mounted on said casing for rotation, an annular field core surrounding the armature and having inwardly extending field pieces and located in and conforming to the wall of said casing, field windings on said field pieces, said field pieces and field windings being spaced apart peripherally whereby to provide a space between the field pieces and windings radially outside of the path of the armature but within the core, a resistance element located in the peripheral space, and means for supporting the element including a core bolt passing through said core and having a plurality of nuts thereon for holding said core fixed in said casing and said resistance element fixed in said space.

12. In an electric motor assembly, a casing of circular section, an armature concentrically mounted for rotation in said casing, an annular field core surrounding said armature and having field pieces extending toward said armature, field windings on said field pieces, a resistance element mounted within the core in the peripheral space between two of said field pieces and their field windings and radially outside of the path of the armature, supporting clips for said resistance element, and a bolt passing through the core and clips for holding said resistance element to said core.

13. In an electric motor assembly, an enclosing shell having substantially a circular cross-section, an annular field core located inside of and fitting said shell, an armature concentric with said shell and core and mounted for rotation in said shell and core, said field core having a portion of its exterior cut away to provide a cavity between the core and shell, a rheostat knob and stem located with the axis at a right angle to the axis of the armature, said stem passing through an aperture in said shell into said cavity, a collar on the inner end of said stem to fit against the inner surface of said shell whereby to hold said stem in position, said collar being located in said cavity, a blade on on said stem within said cavity, and switch points insulatably mounted in said cavity for cooperation with said blade.

14. In an electric motor assembly, the combination with an enclosing shell of circular cross-section having a field core and windings and an armature located therein, of a rheostat blade, a stem passing through an aperture of said shell and having a knob outside of said shell and a collar inside said shell, said knob and collar overlapping the edges of the aperture in the shell whereby to prevent axial movement of the stem, means for securing said blade to the inner end of said stem, an insulating plate secured within said casing opposite said rheostat blade, and switch points on said plate for cooperation with said blade.

15. In an electric motor assembly as in claim 14, an insulating member surrounding said stem of greater radial dimension than said blade and located between said insulating plate and the shell whereby to prevent contact of said rheostat blade with said shell.

16. In an electric motor assembly, an enclosing shell comprising two cup-like portions of circular cross-section adapted to fit against one another at their brims and having notches at their brims, said notches providing an aperture when the said cup-like portions are assembled, a field core having inwardly projecting field pieces and extending inside each said cup-like portion of the shell and being cut away externally opposite one of the field pieces, said cutaway portion providing a cavity inside and communicating with said aperture, a resistance element located in a peripheral space between said field pieces, a clip for supporting said resistance element, a rheostat stem extending through said aperture and having a reduced portion into which the cup-like portions fit to prevent removal of said stem, a switch blade on said stem within the cavity, an insulating plate secured to said core and located in the cavity, switch points on said plate for cooperation with said blade, whereby the core, element, and plate may be inserted and removed from said casing as a unit, and a bolt passing through the two cup-like portions, through said core, and through said clip and having a plurality of nuts thereon for holding said cup-like portions together and upon said stem and for fixing said core within said shell and for holding said clip in fixed position.

In testimony whereof, I affix my signature.

PATRICK J. FITZGERALD.